(12) United States Patent
Pedersen

(10) Patent No.: US 10,881,975 B2
(45) Date of Patent: Jan. 5, 2021

(54) TOY BUILDING SET WITH AN OVERLOAD-SAFE LINEAR ACTUATOR

(75) Inventor: Frank Hohrmann Pedersen, Vejen (DK)

(73) Assignee: LEGO A/S

( * ) Notice: Subject to any disclaimer, the term of this patent is extended or adjusted under 35 U.S.C. 154(b) by 452 days.

(21) Appl. No.: 13/508,792

(22) PCT Filed: Nov. 11, 2010

(86) PCT No.: PCT/DK2010/050304
§ 371 (c)(1),
(2), (4) Date: Sep. 24, 2012

(87) PCT Pub. No.: WO2011/057640
PCT Pub. Date: May 19, 2011

(65) Prior Publication Data
US 2013/0017753 A1    Jan. 17, 2013

(30) Foreign Application Priority Data
Nov. 12, 2009   (DK) .................................. 2009 70202

(51) Int. Cl.
A63H 33/04    (2006.01)
(52) U.S. Cl.
CPC .................................. *A63H 33/042* (2013.01)
(58) Field of Classification Search
CPC .... A63H 33/04; A63H 33/042; A63H 33/062;
F16H 25/20; B60G 21/0553; B23Q 1/58;
H02K 1/06
(Continued)

(56) References Cited

U.S. PATENT DOCUMENTS 2,746,314 A * 5/1956 Donovan ............ F16H 25/2015
74/424
4,482,211 A * 11/1984 Fisher ..................... B60R 1/072
359/877
(Continued)

FOREIGN PATENT DOCUMENTS

CH    2203509 C    * 7/2006
CN    1112951 C    7/2003
(Continued)

OTHER PUBLICATIONS

Notification of Reason for Refusal, in corresponding Japanese Patent Application 2012-538196, mailed on Jan. 9, 2014.
(Continued)

*Primary Examiner* — Eugene L Kim
*Assistant Examiner* — Alyssa M Hylinski
(74) *Attorney, Agent, or Firm* — Valeriya Svystun; Day Pitney LLP

(57) ABSTRACT

A toy building set comprising a number of toy building elements and an overload-safe linear actuator having a center axis and with two spindle parts comprising a first spindle part with an internal thread arranged concentrically to the center axis, and a second spindle part with an external thread screwed into the internal thread on the first spindle part, and wherein the thread on the one spindle is at least twice as long as the thread on the second spindle part. One of the spindle parts being provided with a slot extending through the spindle part longitudinally of the thread configured on the spindle part and essentially along the entire thread, it is accomplished that it is easy to adjust the length of the actuator by pulling or pressing the two spindle parts together or away from each other.

8 Claims, 2 Drawing Sheets

Figure 1:
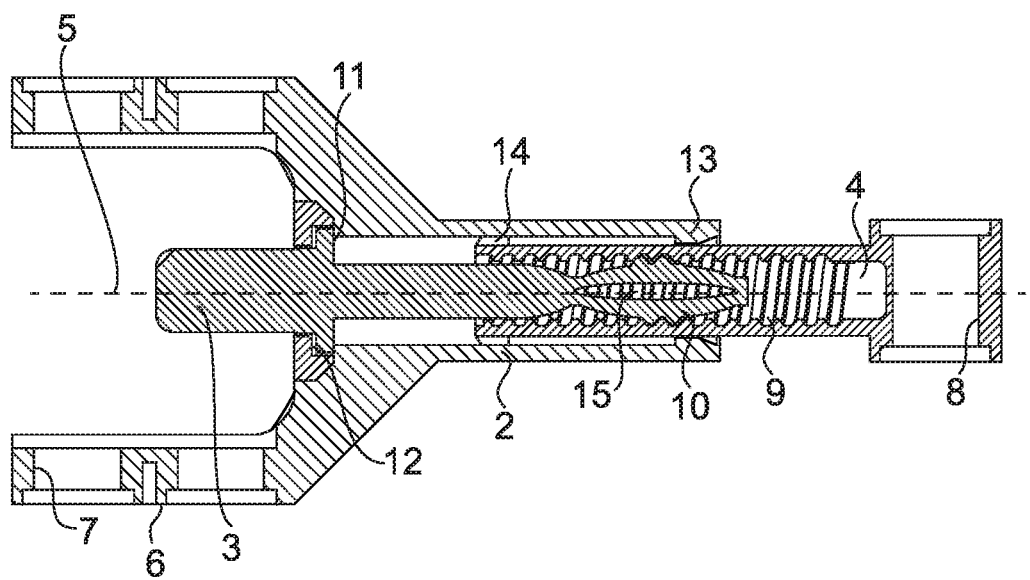

(58) Field of Classification Search
USPC ............ 446/85, 102–104, 120, 121, 90, 91; 74/89.23, 89.24, 89.32, 89.33, 89.34
See application file for complete search history.

(56) References Cited

U.S. PATENT DOCUMENTS

| | | | |
|---|---|---|---|
| 4,846,011 A | | 7/1989 | Gaffney |
| 4,856,885 A | * | 8/1989 | Fimeri .................... B60R 1/072 359/874 |
| 4,998,903 A | * | 3/1991 | Bolli ...................... A63H 31/10 446/102 |
| RE34,142 E | * | 12/1992 | Fimeri .................... B60R 1/072 359/874 |
| 5,411,428 A | * | 5/1995 | Orii et al. ........................ 446/90 |
| 2003/0140720 A1 | * | 7/2003 | Krause ................ B60H 1/0065 74/424.71 |
| 2005/0075036 A1 | * | 4/2005 | Lamb et al. .................. 446/102 |
| 2006/0156838 A1 | | 7/2006 | Las Navas |
| 2007/0032162 A1 | | 2/2007 | Jackson |
| 2007/0147972 A1 | | 6/2007 | Malausa |
| 2009/0044645 A1 | * | 2/2009 | Buescher ................ F16H 25/20 74/89 |
| 2010/0058941 A1 | * | 3/2010 | Rivera .................... A47J 19/02 99/513 |
| 2011/0100141 A1 | * | 5/2011 | Inoue .................. F16H 25/2015 74/25 |

FOREIGN PATENT DOCUMENTS

| | | |
|---|---|---|
| DE | 10122961 | 11/2002 |
| EP | 1331420 A2 | 7/2003 |
| EP | 1927543 A3 | 12/2008 |
| GB | 2185731 | 7/1987 |
| JP | S61-41480 | 2/1986 |
| JP | H10-510171 | 10/1998 |
| WO | 9518559 | 7/1995 |
| WO | 96/14911 | 5/1996 |

OTHER PUBLICATIONS

Chinese Office Action in corresponding Chinese Patent Application No. 201080061289.8, issued on Dec. 20, 2013 (English translation provided).
International Search Report in corresponding international application No. PCT/DK2010/050304, dated Feb. 3, 2011.
International Report on Patentability with Written Opinion of the International Authority in corresponding international application No. PCT/DK2010/050304, dated Feb. 3, 2011.
Supplementary European Search Report in corresponding European application No. EP 10829557, dated Apr. 16, 2013.
CIPO's Examination Report in co-pending Canadian application No. 2,780,341, dated Sep. 12, 2016.

* cited by examiner

TOY BUILDING SET WITH AN OVERLOAD-SAFE LINEAR ACTUATOR

CROSS-REFERENCE TO RELATED APPLICATIONS

This application is the National Phase of PCT/DK2010/050304 filed on Nov. 11, 2010 which claims priority from Danish Patent Application No. PA200970202 filed on Nov. 12, 2009.

FIELD OF USE OF THE INVENTION

The present invention relates to a toy building set comprising is a linear actuator having a centre axis and with two spindle parts comprising a first spindle part with an internal thread arranged concentrically to the centre axis, and a second spindle part with an external thread screwed into the internal thread on the first spindle part, and wherein the thread on the one spindle is at least twice as long as the thread on the second spindle part.

Actuators of this type are used in toy building sets where one uses the actuator eg as a part of a mechanism built from other constituent components of the toy building set to the effect that the mechanism can be moved by means of the actuator. The movement of the mechanism thus takes place by manual rotation of the one spindle part or optionally by coupling an electromotor to the one spindle such that the thread in the linear actuator converts the rotation of the one spindle part into a translation movement of the other spindle part whereby the mechanism moves when the one spindle part is rotated. That type of actuators being generally self-locking the mechanism will often lock in its position unless the one spindle part is rotated.

STATE OF THE ART

Thus, GB patent disclosure No. 2185731 teaches a linear actuator of the above-referenced type, said actuator being suitable in particular for being built into a toy building set, and wherein the actuator comprises an electromotor for rotating the one spindle to the effect that a translation movement of the other spindle is achieved. Furthermore, a coupling mechanism is provided in connection with the drive shaft driving the actuator, said coupling being configured such that it is possible to transfer only a certain moment onto the drive shaft and thereby such that the electromotor is not overloaded eg when the actuator reaches its extreme positions.

It is a problem in the context of using linear actuators in toy building sets, however, that there are several options for building different mechanisms or constructions. The different mechanisms and constructions thus make different demands to the linear actuator, the linear actuator in one mechanism will eg have a shorter maximal stroke length than if the same linear actuator was mounted in another mechanism, or that, in order to be mounted in one mechanism, the linear actuator must be completely contracted, whereas it should be completely projected in order for it to be mounted in another mechanism. By use of a linear actuator according to GB patent disclosure No. 2185731 that would presuppose adjustment of the length of the linear actuator prior to it being mounted in a given mechanism.

Add to this that, as it is, it should be possible to cause such mechanisms or constructions to move by means of the linear actuator, and hence it is possible to build mechanisms that will influence the linear actuator in use by an excessive force and which would thereby easily destroy the linear actuator or the toy building set as such irrespective of whether it is driven by an electromotor or is operated manually.

OBJECT OF THE INVENTION

It is therefore the object of the present invention to provide a toy building set by which it is easy, by simple means, to mount the linear actuator in a given toy mechanism constructed from the toy building set, while simultaneously the risk of destroying the linear actuator or the toy building set as such is minimised irrespective of whether the user of the toy building set has built a structure containing a mechanism which could, in some circumstances, have a destructive effect on the linear actuator or the toy building set in use.

In accordance with the invention this is accomplished by configuring a slot on one of the spindle parts, said slot extending through the spindle part longitudinally of the thread configured on the spindle part and essentially along the entire thread.

Thus, the slot splits up the thread in two parts which are comparatively elastic relative to each other. Thereby the two threads can easily be shifted essentially radially outwards or inwards relative to each other to the effect that the linear actuator can be pulled out or contracted without an ensuing need for screwing the spindle parts relative to each other. The two threads will thereby operate as a kind of linear ratchet mechanism rather than functioning as a spindle mechanism.

In this context, the slot may be arranged both on the spindle part having the internal thread or on the one having the external thread, but the latter solution is the most favourable one since, if the slot is configured on the spindle part having the external thread, the most compact solution is obtained.

In this context, the thread on the second spindle part advantageously extends along the major part of the slot to the effect that the remaining part of the spindle part is, to the widest extent possible, not slotted, meaning that the spindle is not weakened in areas where it is not absolutely necessary.

Further advantageously, the actuator is configured such that the thread on the first spindle part has a thread length which is equal to or larger than the total stroke length of the actuator; and that the thread on the second spindle part is substantially shorter to the effect that the first spindle part constitutes a pipe that protects the thread and other parts on the second spindle part.

Particularly advantageously, the linear actuator is further provided with an actuator housing in which, about a centre axis, guides are configured for receiving the two spindle parts; and wherein the guides are arranged such that they only allow the one spindle part to rotate both ways about the centre axis and allow the other spindle part to shift along the centre axis. Thereby it is accomplished that it is easy to construct a mechanism or construction in which the linear actuator can be mounted, while simultaneously it entails a particularly strong construction, the spindle parts being built integrally with the actuator housing and completely or partially protected thereby.

The guides in the actuator housing are preferably configured such that they allow only the second spindle part to rotate about the centre axis and allow the first spindle part to shift along the centre axis.

For instance, in order to ensure against a child destroying the actuator, the actuator housing advantageously comprises a pipe with an opening at each end, and wherein the first spindle part extends out through the first opening in the pipe, and the second spindle part extends out through the second opening in the pipe, and wherein the first spindle part has an essentially circular flange which is introduced into a circular recess configured at the first opening on the inside of the pipe of the actuator housing. Thereby the most essential ones of the active parts of the actuator are predominantly concealed and inaccessible to the user without this entailing a need for separate elements for covering the active parts.

This is further ensured if the second spindle part extends out through a guide configured on the inside of the actuator pipe at the second opening.

If the thread on the first spindle part is arranged in the second opening and is connected to the circular flange via a rod extending from the circular flange and inwards through the hole formed by the internal thread on the second spindle part, it is accomplished that both the second spindle part and the guide on the actuator housing contributes to pressing the two thread parts on the first spindle part together, which in turn means that it is not necessary to dimension one of these parts to provide, in itself, the requisite force impact.

To drive the linear actuator according to the invention, the first spindle part may advantageously be configured with a coupling means extending from the circular flange and out of the pipe through the first opening, which coupling means is configured for interconnection with a second building element.

Further advantageously, this coupling means may be configured as a shaft arranged concentrically about the centre axis, said shaft being configured with one or more longitudinally extending grooves.

LIST OF FIGURES

FIG. 1: is a perspective view of an actuator according to the present invention. Seen in an inclined view from above.

Figure 2:
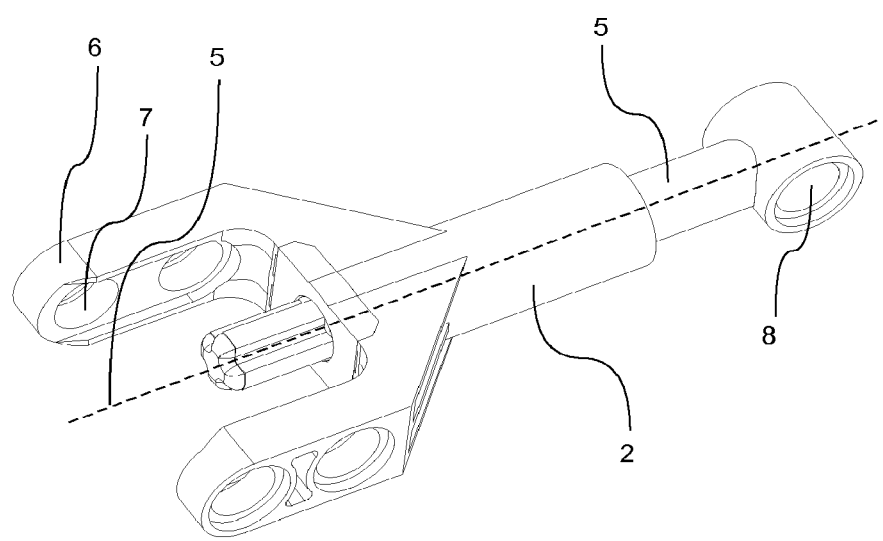

FIG. 2: is a sectional view along the centre axis of the actuator shown in FIG. 1, seen in an inclined view from above and in perspective.

EMBODIMENT OF THE INVENTION

Thus, FIG. 1 shows a linear actuator 1 which is a part of a toy building set, which is not shown herein, the structural configuration of the toy building set not being in itself of any consequence to the effect of this invention. The actuator 1 comprises an actuator housing 2, a drive shaft 3 and a piston rod 4 which combine to define a centre axis 5.

The linear actuator 1 is configured such that, when the drive shaft 3 is rotated about the centre axis 5, the piston rod 4 is shifted along the centre axis 5 out of the actuator housing 2 when the drive shaft is rotated the one way around, and into the actuator housing 2 when the drive shaft is rotated the opposite way around.

As will appear from FIG. 1, the drive shaft 3 is configured as a cross-bar or a shaft with four longitudinally extending grooves 22, but in principle other embodiments of the drive shaft can be selected in response to the construction of the toy building set for which the linear actuator 1 is to be used.

Moreover, the actuator housing 1 has a set of brackets 6 which are provided with mounting apertures 7 configured with a view to mounting of the actuator on a structure built from elements of a toy building set, and, in the same manner, the piston rod 4 has a mounting aperture 8 for mounting of the piston rod 4 to a structure built from toy building elements.

Thereby, an actuator 1 which is mounted in a built toy structure can be used to displace that part of the toy structure which is secured to the piston rod 4 away from another part of the toy structure which is secured to the actuator housing 2, to the effect that the linear actuator is thereby capable of performing various functions in a toy building set, it being eg capable of simulating a hydraulic jack or a hydraulic cylinder.

FIG. 2 shows the same linear actuator 1 as is shown in FIG. 1, but wherein the linear actuator 1 is shown in a sectional view by a section along the centre axis 5. It appears from this that the linear actuator converts the rotation of the drive shaft 3 to a translational movement of the piston rod by an internal thread 9 being configured internally of the piston rod which cooperates with an external thread 10 on the drive shaft 3. Thereby the drive shaft 3 and the piston rod 4 constitute two spindle parts which, when the one spindle part 3, 4 is rotated relative to the other about the centre axis 5, displace the two spindle parts 3, 4 away from each other or towards each other, depending on which way they are rotated relative to each other.

The drive shaft 3 being configured with a circular flange 11 which, at its periphery, engages with the annular recess 12 configured in the actuator housing 2, the drive shaft is retained against displacement thereof along the centre axis 5.

Conversely, between the piston rod 4 and the actuator housing 2, guides 13 and 14 configured on the inside of the actuator pipe 20 are arranged that allow the piston rod to be displaced along thecentre axis 5 relative to the actuator housing.

In the context of toy building sets it is thus obvious that the user of the toy building set is often incapable of estimating the magnitude of the forces which such actuator may absorb without it being destroyed. Therefore, according to the invention, a slot 15 is established at the thread 10 of the drive shaft 3, which slot 15 cuts through the thread 10 of the drive shaft 3 in such a manner that the thread 10 is split into two separate threads that can be pressed elastically towards each other to the effect that, by the compression, they let go of their engagement with the internal thread 9 on the piston rod 4. That slot must possess a width which is larger than the height of the ribs of threads 9, 10 whereby that slot allows the threads to disengage.

In the shown embodiment the slot 15 is configured such that it extends completely within the drive shaft 3 to the effect that the two separate thread portions 10 are, at both its end, brought together. Hereby it is obtained that thread halves that constitute the thread 10 are springed uniformly along the entire thread 10 to the effect that reduced and more uniform wear is accomplished on the individual thread ridges of the thread 10. However, it would be obvious to the person skilled in the art that it is alternatively an option that the slot 15 is taken eg completely to the end of the drive shaft 3.

Albeit the shown embodiment is the one most suitable one for use in the context of toy building sets, it is obvious that it is possible to establish a corresponding effect eg by establishing a slot through the piston rod 4 instead of the shown slot 15 on the drive shaft 3. Such slot, however, should be longer as, essentially, it should extend along the entire internal thread 9. Moreover, it is also obvious that an alternative embodiment would be to allow the drive shaft to have an internal thread and to allow the piston rod to have an external thread, and in this context it would also be an option to select whether the slotting should be made in the internal or the external thread.

Based on the above description, it will be obvious to the person skilled in the art that, at least inasmuch as the spindle part 3, 4 is concerned—which is configured with a slot in accordance with the present invention, it should be made of a material which, at least at the location of the slot, is sufficiently elastic to be deformed sufficiently for the two threads 9, 10 to disengage, but without thereby entailing a plastic deformation of the material. A material which is suitable for this purpose is POM or other plastics material if only small forces are to be transmitted during use of the linear actuator, but if larger forces are to be transmitted, it is an option to use eg metal as material instead of plastics.

The invention claimed is:

1. A linear actuator for a toy building set, comprising:
    a centre axis and two thread parts, the two thread parts comprising a first thread part with an internal thread arranged concentrically to the centre axis, and a second thread part with an external thread screwed into the internal thread on the first thread part, and
    wherein a length that the internal thread of the first thread part extends along the first thread part is at least twice as long as a length that the external thread of the second thread part extends along the second thread part;
    wherein a slot is provided within the external thread of the second thread part, said slot extending longitudinally through and within said external thread of said second thread part such that the external thread is split into two halves with the slot enclosed there-between, the two halves of the external thread being connected to one another on both ends of the slot and capable of being shifted elastically in a direction towards or away from each other, and
    wherein the internal thread on the first thread part has a thread length which is longer than a total stroke length of the linear actuator.

2. The linear actuator for a toy building set according to claim 1, characterised in that the linear actuator comprises an actuator housing which can be mounted on one or more toy building elements; and wherein the actuator housing defines the centre axis of the actuator, the actuator housing being configured with guides for receiving the two thread parts, said guides being configured such that they allow only the first thread part to rotate both ways about the centre axis, and allow the second thread part to be shifted along the centre axis.

3. The linear actuator for a toy building set according to claim 1, characterised in that the linear actuator comprises an actuator housing which can be mounted on one or more toy building elements; and wherein the actuator housing defines the centre axis of the actuator, the actuator housing being configured with guides for receiving the two thread parts, said guides being configured such that they allow only the second thread part to rotate both ways about the centre axis, and allow the first thread part to be shifted along the centre axis.

4. The linear actuator for a toy building set according to claim 2, characterised in that the actuator housing comprises a pipe with a first opening at a first end and a second opening at a second end; and wherein the first thread part extends out through the first opening in the pipe, and the second thread part extends out through the second opening in the pipe; and wherein the second thread part has an essentially circular flange which is conveyed into a circular recess configured at the second opening on an inside of the pipe of the actuator housing.

5. The linear actuator for a toy building set according to claim 4, characterised in that the first thread part extends out through one of said guides configured on an inside of the actuator housing pipe at the first opening.

6. The linear actuator for a toy building set according to claim 4, characterised in that the thread on the second thread part is arranged in the second opening and is connected to the circular flange via a rod extending from the circular flange and into an aperture formed by the internal thread on the second thread part.

7. The linear actuator for a toy building set according to claim 6, characterised in that the second thread part has a coupling means extending from the circular flange and out of the pipe through the second opening, said coupling means being configured for interconnection with a second of said one or more building elements.

8. The linear actuator for a toy building set according to claim 7, characterised in that the coupling means is configured as a shaft arranged concentrically about the centre axis, said shaft being provided with one or more longitudinally extending grooves.

* * * * *